United States Patent [19]

Dammann et al.

[11] Patent Number: 6,078,384
[45] Date of Patent: Jun. 20, 2000

[54] PROCESS AND ARRANGEMENT FOR THE EVALUATION OF LASER DOPPLER SIGNALS

[75] Inventors: Ehrhard Dammann; Juergen Bauer, both of Jena, Germany

[73] Assignee: Jenoptik Aktiengesellschaft, Jena, Germany

[21] Appl. No.: 09/130,754

[22] Filed: Aug. 7, 1998

[30]     Foreign Application Priority Data

Sep. 26, 1997 [DE] Germany ............... 197 42 608

[51] Int. Cl.$^7$ ................ G01P 3/36; G01B 9/02; G01N 21/41
[52] U.S. Cl. ................................. 356/28.5; 73/657
[58] Field of Search ..................... 356/28.5; 73/657

[56]     References Cited

U.S. PATENT DOCUMENTS 3,982,101  9/1976  Kalb et al. .
4,856,899  8/1989  Iwaoka et al. ................ 356/28.5

FOREIGN PATENT DOCUMENTS

0355300  of 1989  European Pat. Off. .
2841499  of 1980  Germany .

*Primary Examiner*—Stephen C. Buczinski
*Attorney, Agent, or Firm*—McAulay Nissen Goldberg Kiel & Hand, LLP

[57] ABSTRACT

Processes and arrangements for the evaluation of laser Doppler signals, especially in laser Doppler anemometers (LDA) or vibrometers, are disclosed. The object of these processes and arrangements is to find a simple possibility for evaluating laser Doppler signals which retains the advantages of conventional frequency tracking demodulation and permits dependable actual measurements of velocities and derived movement values also for extremely low velocities and discontinuous particle flows. This object is achieved with the use of a laser Doppler anemometer (LDA) with bandpass filtration and frequency tracking demodulation, by generating at least one orthogonal frequency system which, as a sequence of four state intervals in an invertible one-to-one correlation, is formed of two additively superimposed rectangular functions with a phase displacement of $\pi/2$, a detector signal containing the Doppler frequency ($f_D$) is compared after bandpass filtering with respect to its phase with the state intervals of the orthogonal frequency system, wherein a change in the phase position relative to the orthogonal frequency system triggers a compensation of the change in Doppler frequency generating a regulated mixing frequency ($f_M$) which is coupled into the LDA, and the regulated mixing frequency ($f_M$), as an equivalent of the Doppler frequency ($f_D$), is likewise compared with an orthogonal frequency system and, as a result of the one-to-one sequence of state intervals, is evaluated such that the direction is designated.

29 Claims, 6 Drawing Sheets

PROCESS AND ARRANGEMENT FOR THE EVALUATION OF LASER DOPPLER SIGNALS

BACKGROUND OF THE INVENTION a) Field of the Invention

The invention is directed to processes and arrangements for the evaluation of laser Doppler signals, especially in laser Doppler anemometers (LDA) or vibrometers.

b) Description of the Related Art

At present, laser Doppler devices for the measurement of velocities and quantities derived therefrom such as length and acceleration are commercially available. They are distinguished from one another by optical construction, electronic control and evaluation for special measurement tasks. Typical known optical arrangements are LDA's based on the intersecting beam or crossbeam principle and the reference beam principle which are described thoroughly in Laser und Optoelektronik 20 (3), 1988, pages 73–78. The same reference source also contains an explanation of the distinction between the principles of control and evaluation which is drawn by the classification into the homodyne and heterodyne methods. In the case of the evaluation method, tracking methods have prevailed over frequency analysis methods and computer methods because of the possibility of real time demodulation of the Doppler signal which supplies an analog signal with velocity-proportional voltage at any time.

The technical problem basically consists in that the frequency range to be evaluated must always contain the entire width of the possible Doppler frequency (often several MHZ). On the other hand, the signal-to-noise ratio (SNR) is inversely proportional to the filter bandwidth. Therefore, the filter bandwidth must be kept as small as possible. In heterodyne laser Doppler devices, this can be realized in a simple manner based on the frequency offset by way of frequency tracker demodulation described, e.g., by DURST et al. (Theorie und Praxis der Laser-Doppler-Anemometrie [Theory and Practice of Laser Doppler Anemometry], G. Braun Verlag, Karlsruhe, 1987, pages 284–290). In this respect, an offset heterodyne tracking method, as it is called, proves especially advantageous (DURST, et al., p. 285).

A frequency tracker demodulation of this kind basically comprises a frequency mixer, a bandpass filter (IF filter), a frequency discriminator or phase discriminator, an integrator, and a voltage-controlled oscillator (VCO) which is fed back to the frequency mixer.

The Doppler signal is mixed with the output signal of the VCO and the resulting mixed signal with two sidebands is subjected to narrow-band filtration to the intermediate frequency. Changes in the Doppler frequency are compensated in the control loop outlined above by changing the VCO frequency. For this purpose, the integrator regulates the transient response and the stability of the control loop. In the heterodyne LDA, the frequency offset, which is very constant as a rule, is utilized for frequency tracking demodulation and a bandpass filter is used with the offset frequency as center frequency. The frequency of the VCO is variably adjustable by means of a discriminator to compensate for a Doppler shift. A distinction is made between frequency discriminators and phase discriminators.

In the case of frequency discriminators, every change in the Doppler frequency generates an error voltage proportional thereto because the intermediate frequency is changed precisely by the amount of the Doppler shift. With the error voltage at the output of the discriminator, the VCO readjusts its frequency until the intermediate frequency again coincides with the center frequency of the bandpass filter.

The disadvantage of the frequency discriminator consists in that the linear range of the voltage frequency characteristic is relatively narrowly defined, so that large changes in the Doppler frequency cannot be sufficiently compensated by the VCO.

Signal evaluating systems working with phase differences use phase discriminators. In this case, the output signal of the bandpass filter is initially transformed almost to a square-wave signal in an amplitude limiter. The output signal of the phase discriminator is the product of two square-wave signals. It corresponds to twice the center frequency (resonant frequency) when the intermediate frequency equals the center frequency of the bandpass filter. A deviation in the intermediate frequency causes the integrator to generate an error voltage which readjusts the VCO. The disadvantage of phase discriminators consists in the susceptibility to small phase variations caused by the finite transit time of scattering particles in the measurement volume. Therefore, in ensembles of scattering particles which traverse the measurement volume in different phase positions, a variable Doppler shift is recorded even at a constant velocity of the ensembles.

Further, a tracking method has also been developed for homodyne LDA's. Wilshurst and Rizzo (J. Physics E: Sci. Instruments 8, 47) disclose an autodyne evaluating method, as it is called, in which the reception signal carrying the Doppler frequency is mixed separately with two components of a VCO signal which are at a 90-degree phase offset. The high-frequency component is eliminated from the mix signal in each case by a low-pass before each mix signal is mixed with the other signal supplied through a differential element and the multiplication results are averaged by a summing amplifier. Apart from a lower signal-to-noise ratio compared with heterodyne trackers, the chief disadvantage in this tracking method is that it can not be used for small Doppler frequencies because it would then no longer be possible to filter out the interfering sideband without clipping the Doppler signal. In any case, accurate results are achieved only when the range of the anticipated Doppler shift is known beforehand and does not change suddenly and when no temporary dropouts of the Doppler signal are expected.

The above-mentioned signal dropouts in the case of discontinuous flows or particle movements represent the general flaw in the known methods of frequency tracking demodulation which decisively impairs the accuracy and stability of the Doppler frequency.

Further, solutions for phase-modulated LDA's are known in the art, wherein DE 195 37 647 A1 should be mentioned by way of example because it discloses a remarkable optical double modulation with two modulation frequencies with a whole-number frequency ratio, which modulation frequencies are coupled so as to be fixed with respect to phase and frequency, and evaluation of a sideband, wherein the anticipated maximum Doppler shift must be taken into account for the bandwidth of the bandpass which is fixed at a common multiple of the modulation frequencies. This always leads to deterioration of the signal-to-noise ratio.

OBJECT AND SUMMARY OF THE INVENTION

It is the primary object of the invention to find a simple possibility for evaluating laser Doppler signals which retains the advantages of conventional frequency tracking demodulation and permits dependable actual measurements of velocities and derived movement values also for extremely low velocities and discontinuous particle flows.

In a method for the evaluation of laser Doppler signals using a laser Doppler anemometer (LDA) with bandpass filtration and frequency tracking demodulation to compensate for changes in the Doppler frequency with respect to the bandpass filtration, this object is met, according to the invention, in that at least one orthogonal frequency system formed of a sine function and a cosine function of identical frequency is generated, transformed into a system of square-wave or rectangular functions and changed by additive superimposition into a sequence, recurring at $2\pi$, of four state intervals in an invertible one-to one-correlation, wherein interval limits in the form of hops or jumps of one of the two superimposed rectangular functions are assigned to the state intervals at a distance of $\pi/2$, in that a detector signal containing the Doppler frequency is compared after bandpass filtering with respect to its phase with the state intervals of the orthogonal frequency system, wherein a change in the phase position relative to the orthogonal frequency system containing at least one jump and, therefore, a transition to another state interval, triggers the aforementioned compensation of the change in Doppler frequency by means of generating a regulated mixing frequency which is coupled into the LDA, and the regulated mixing frequency is likewise scanned and compared with an orthogonal frequency system, wherein the mixing frequency is itself detected as an equivalent of the Doppler frequency and, as a result of the invertible single-value sequence of state intervals, is evaluated such that the direction is designated.

The orthogonal frequency system for the unequivocal identification of the direction of the change in Doppler frequency is advantageously formed of two rectangular functions with different amplitudes, wherein one rectangular function is preferably valued at twice the amplitude of the other rectangular function, and, as a result of the jumps in the rectangular functions, a periodic sequence of state intervals results as a superimposition of rectangular functions, so that the values of the state intervals change differently at a distance of $\pi/2$ and repeat in the identical sequence only after $2\pi$.

In this respect, the orthogonal frequency system is advisably generated by frequency division from an oscillator.

A further advantage is provided in that one and the same orthogonal frequency system is used for scanning the detector signal, for the regulation of the mixing frequency and for scanning the regulated mixing frequency for determining the actual Doppler frequency.

In a homodyne LDA, after a high-pass filtering of the detector signals, the Doppler frequency is advantageously mixed electronically with the regulated mixing frequency and a Doppler frequency which is phase-shifted by $\pi/2$ is electronically mixed with a regulated mixing frequency which is phase-shifted by $\pi/2$, wherein two signal channels are generated which contain two sidebands of the Doppler frequency, the two signal channels are reunited by subsequent addition or subtraction, wherein one of the sidebands is eliminated, the remaining sideband is compared with the orthogonal frequency system for regulating the mixing frequency, and the regulated mixing frequency is scanned with the orthogonal frequency system for evaluating the Doppler frequency.

Advantageous arrangements of the invention are possible in different ways in heterodyne LDA's.

For one, the regulated mixing frequency is preferably added by mixing electronically directly before the bandpass filter.

In a second possibility in a heterodyne LDA with frequency offset, the mixing frequency is advisably used directly for regulation of the frequency offset and the regulated offset frequency is compared with the orthogonal frequency system for evaluation of the Doppler frequency.

The third variant is used in a heterodyne LDA with electrooptical phase modulation for the generation of the sending beams of the LDA, in which at least one sending beam is modulated sinusoidally with two different modulation frequencies which are coupled so as to be fixed with respect to phase and frequency, wherein one modulation frequency is a whole-number multiple of the other frequency, a bandpass filtration is carried out in a common multiple of the two modulation frequencies, and a single-sideband suppression is carried out at the two sidebands resulting from the phase modulation by means of suitable adjustment of the phase deviation of the two modulation frequencies. In this case, the regulated mixing frequency is advantageously used to control the phase modulation frequencies and is simultaneously compared, as one of the coupled phase modulation frequencies, with the orthogonal frequency system for evaluation of the Doppler frequency.

With respect to the further development of the invention in the heterodyne LDA with frequency offset, the controlling of the offset frequency can advantageously be carried out by electrooptical or acoustooptical means in order to compensate for the change in the Doppler frequency through a baseband shift.

Two further embodiment forms, according to the invention, of heterodyne LDA's are given for reference beam LDA's.

In a reference beam LDA in which a frequency offset is generated in at least the measurement beam or reference beam, wherein the reference beam is imaged directly on the detector of the LDA, the measurement beam is directed onto a measurement object and light of the measurement beam scattered at measurement object particles is superimposed with the reference beam on the same detector, and a superimposition signal comprising the light of the reference beam and measurement beam is evaluated with respect to a Doppler shift of the frequency, the mixing frequency regulated by the voltage-controlled oscillator is preferably used to regulate the frequency offset of the LDA, wherein the offset frequency is adapted to compensate for the change of the Doppler frequency, and the regulated offset frequency is compared with the orthogonal frequency system for evaluation of the Doppler frequency.

In a reference beam LDA in which a phase modulation is carried out in at least one of the measurement beam and reference beam, wherein the reference beam is imaged directly on the detector of the LDA, the measurement beam is directed onto a measurement object, the light scattered at measurement object particles is superimposed with the reference beam on the same detector, and a superimposition signal from the light of the reference beam and measurement beam is evaluated with respect to the Doppler shift, an optical phase modulation is advisably carried out with two different sinusoidal modulation frequencies which are coupled so as to be fixed with respect to phase and frequency and wherein one modulation frequency is a whole-number multiple of the other frequency, filtration is carried out with a bandpass filter at a common multiple of the two modulation frequencies, wherein a single-sideband suppression is carried out at the two sidebands resulting from the phase modulation by means of suitable adjustment of the phase deviation of the two modulation frequencies, the mixing frequency regulated by the voltage-controlled oscillator is used to control the phase modulation frequencies, and this mixing frequency is compared with the orthogonal frequency system for evaluation of the Doppler frequency.

Object particles of an oscillating surface are advantageously observed with the reference beam LDA according to the invention. Length increments of the surface oscillations are advisably determined by counting the state intervals of the orthogonal frequency systems that have been passed over, wherein the counting values are stored intermediately and the counter state is detected at a suitable scan rate. The frequency spectrum of the oscillations and/or the oscillation amplitudes or the entire course of oscillation is/are preferably determined from the counting values of the length increments.

In a homodyne LDA with frequency tracking modulation, in which a change in a Doppler frequency contained in the detector signal is constantly compensated by means of a control loop, wherein the detector signal is divided into two signal paths in the control loop and electronic mixers for mixing the divided detector signal with two output signals of a voltage-controlled oscillator, these output signals being offset in phase by $\pi/2$, are contained in the signal paths and the two signal paths are combined after mixing on a summing element whose output is applied to the voltage-controlled oscillator via an integrator, the above-mentioned object is met, according to the invention, in that a $\pi/2$-phase shifter is provided for the splitting of the detector signal into two signal paths, wherein two detector signals which are out of phase by $\pi/2$ are formed, each detector signal being joined with the two out-of-phase signals of the voltage-controlled oscillator in a mixer, and the outputs of the mixers are connected with the summing element, in that the summing element is connected on the output side with a phase/frequency comparator by a narrowband bandpass filter for comparing the mix signal with an orthogonal frequency system, in that the orthogonal frequency system is formed by a sine function and cosine function of the same frequency which are transformed into a system of rectangular functions, and contains a sequence, recurring at $2\pi$, of four state intervals in an invertible one-to-one correlation, wherein interval limits in the form of jumps of one of the two additively superimposed rectangular functions are assigned to the state intervals at a distance of $\pi/2$, in that the phase/frequency comparator is connected with the voltage-controlled oscillator via the integrator, wherein the output frequency of the voltage-controlled oscillator is changed every time a state interval limit of the orthogonal frequency system is exceeded, in that the output signal of the voltage-controlled oscillator is, at the same time, a measurement quantity which can be evaluated as equivalent to the change in Doppler frequency, and in that another phase/frequency comparator is provided for evaluating the measurement quantity for the change in the Doppler frequency, the output signal of the voltage-controlled oscillator as well as an orthogonal frequency system being supplied to the additional phase/frequency comparator for the evaluation of the phase position of the measurement quantity with respect to the quantity and direction of the state intervals of the orthogonal frequency system that have been passed through.

A high-pass filter is advisably arranged anterior to the splitting of the detector signal.

In a heterodyne LDA with frequency tracking demodulation in which a control loop is provided to compensate for changes in the Doppler frequency, wherein the control loop has, after a bandpass filter, a phase discriminator, an integrator and a voltage-controlled oscillator and is returned to an electronic frequency mixer prior to the bandpass filter, so that a mix signal of constant frequency formed from the Doppler frequency and from a regulated mixing frequency is constantly adjusted at the input of the bandpass filter, the object according to the invention is further met in that a phase/frequency comparator is used as a phase discriminator for comparing the mix signal passed by the bandpass filter with an orthogonal frequency system, in that the orthogonal frequency system is formed from a sine function and a cosine function of the same frequency which are transformed into a system of rectangular functions and, by means of additive superimposition, contains a sequence, recurring at $2\pi$, of four state intervals in an invertible one-to-one correlation, wherein interval limits in the form of jumps of one of the two additively superimposed rectangular functions are assigned to the state intervals at a distance of $\pi/2$, in that there is another phase/frequency comparator for evaluation of the Doppler frequency, the output signal of the voltage-controlled oscillator, as equivalent of the change in Doppler frequency, being supplied to the additional phase/frequency comparator, and the additional phase/frequency comparator is likewise provided with an orthogonal frequency system as a basis of comparison for the evaluation of the phase position with respect to the quantity and direction of the state intervals of the orthogonal frequency system that have been passed through.

Further, in a heterodyne LDA with frequency tracking demodulation in which there is a control loop to compensate for changes of the Doppler frequency, wherein the control loop has, after a bandpass filter, a phase discriminator, an integrator and a voltage-controlled oscillator and is returned to a frequency mixer, so that a mix signal of constant frequency formed from the Doppler frequency and a regulated mixing frequency of the voltage-controlled oscillator is constantly adjusted at the input of the bandpass filter, the object of the invention is met, according to the invention, in that a phase/frequency comparator is used as a phase discriminator for comparing the mix signal passed by the bandpass filter with an orthogonal frequency system, in that the orthogonal frequency system is formed from a sine function and a cosine function of the same frequency which are transformed into a system of rectangular functions and, by means of additive superimposition, contains a sequence, recurring at $2\pi$, of four state intervals in an invertible one-to-one correlation, wherein interval limits in the form of jumps of one of the two additively superimposed rectangular functions are assigned to the state intervals at a distance of $\pi/2$, in that the frequency offset of the LDA is configured in a controllable manner as frequency mixer for regulating the input signal of the bandpass filter, wherein the output signal of the voltage-controlled oscillator is used directly for controlling the offset frequency, and in that there is another phase/frequency comparator for evaluation of the Doppler frequency, the output signal of the voltage-controlled oscillator, as equivalent of the change in the Doppler frequency, being supplied to the additional phase/frequency comparator, and the additional phase/frequency comparator is likewise provided with an orthogonal frequency system as a basis of comparison for the evaluation of the phase position with respect to the quantity and direction of the state intervals of the orthogonal frequency system that have been passed through.

In this case, there is at least one Bragg cell for controlling the frequency offset, or an electrooptical phase modulator is used for controlling the frequency offset.

In a heterodyne LDA with optical phase modulation in which light from at least two coherent partial beams is superimposed on light-scattering moving measurement objects after at least one of the partial beams has passed through a phase modulator, and at least components of the partial beams impinge on at least one detector as scattered light, wherein two sinusoidal driving signals which have different frequencies and amplitudes and are coupled so as to be fixed with respect to phase and frequency are supplied to the phase modulator, wherein one frequency is a whole-number multiple of the other frequency, wherein a bandpass filter with a filter frequency which is a common multiple of the two frequencies of the phase modulator is arranged following the detector, one of two sidebands resulting from the double phase modulation is suppressed in the signal at the output of the bandpass filter by means of adjusting the phase deviation of the driving signals of the phase modulator, and the remaining sideband is evaluated as a mix signal with the Doppler frequency, a further solution to the problem posed by the invention is achieved in that the bandpass filter is made narrowband and there is a control loop to compensate for changes in the Doppler frequency, in that the control loop has, after the bandpass filter, a phase discriminator, an integrator and a voltage-controlled oscillator, wherein the voltage-controlled oscillator influences the phase modulation frequencies at the phase modulator so that a mix signal of constant frequency formed from the Doppler frequency and a multiple of the phase modulation frequencies regulated by the voltage-controlled oscillator is always adjusted at the input of the bandpass filter, in that a phase/frequency comparator is used as a phase discriminator for comparing the mix signal passed by the bandpass filter with an orthogonal frequency system, in that the orthogonal frequency system is formed from a sine function and a cosine function of the same frequency which are transformed into a system of rectangular functions and, by means of additive superimposition of the functions, contains a sequence, recurring at $2\pi$, of four state intervals in an invertible one-to-one correlation, wherein interval limits in the form of jumps of one of the two additively superimposed rectangular functions are assigned to the state intervals at a distance of $\pi/2$, in that there is another phase/frequency comparator for evaluation of the Doppler frequency, the output signal of the voltage-controlled oscillator, as equivalent of the change in the Doppler frequency, being supplied to the additional phase/frequency comparator, and the additional phase/frequency comparator is likewise provided with an orthogonal frequency system as a basis of comparison for the evaluation of the phase position with respect to the quantity and direction of the state intervals of the orthogonal frequency system that have been passed through.

It is advantageous for all of the LDA's according to the invention when an oscillator is provided with a subsequent frequency divider and $\pi/2$-phase shifter to generate the orthogonal frequency system. In this case, a 1:4-quadrature divider which follows the oscillator is especially advantageous.

Further, it has proven advisable in all of the LDA's according to the invention that the phase/frequency comparator for generating the regulated mixing frequency has at its output only one direction signal by means of which an adjoining associated voltage stage is available for the VCO at the subsequent integrator output. A counter is preferably provided subsequent to the additional phase/frequency comparator for the evaluation of the Doppler frequency, wherein a counting pulse is supplied to the counter in addition to a direction signal of the phase/frequency comparator, wherein the counter detects the magnitude of the deviation of the Doppler frequency in interval transitions of the orthogonal frequency system.

In the case of heterodyne LDA's, it is advisable for some applications that the LDA is constructed as a reference beam LDA, as it is called, wherein the light of a laser is divided into measurement beam and reference beam, the reference beam is guided directly to the detector, the measurement beam is imaged on an object, light from the measurement beam scattered on object particles is superimposed with the reference beam on the same detector, and the superimposition signal generated in this way can be evaluated with respect to the Doppler frequency, wherein the Doppler frequency is again compared, as a regulated mix signal at the output of the voltage-controlled oscillator of the control loop, with the orthogonal frequency system.

An advantageous application of the reference beam LDA's is provided when the measurement object is an oscillating surface on which the measurement beam impinges substantially orthogonally, and a counter, a scanning oscillator, an intermediate storage and an evaluating unit are arranged subsequent to the additional phase/frequency comparator for evaluation, wherein the quantity of state interval limits of the orthogonal frequency system that have been passed through is available at the counter output as direction-identified counting values, the scanning oscillator has an adjustable scanning frequency for intermediate storage of the temporally ordered counting values, and the evaluating unit has different output modes for parameters of the measured oscillating movements of the surface.

The fundamental idea of the invention is based on the consideration of improving narrowband filtration of the LDA reception signal which is known for improving the signal-to-noise ratio, including the introduced control loop (frequency tracking demodulation) to compensate for changes in the Doppler frequency, in such a way that temporary signal dropouts or phase jumps due to particles or ensembles of particles detected simultaneously in the measurement volume do not lead to an erroneous measured Doppler frequency. For this purpose, the orthogonal frequency system according to the invention was introduced as a phase discriminator which inherently has an invertible one-to-one directional correlation of Doppler frequency changes as a result of defined state intervals and ensures that a control signal for compensation of a change in the Doppler frequency is triggered only when the phase position of the mix signal containing the Doppler frequency passes a state interval limit. Accordingly, signal dropouts or jumps in the phase position of the mix signal can not cause errors in the control of the control loop, and the output signal of the voltage-controlled oscillator (VCO) can be evaluated directly as an equivalent of the actual Doppler frequency. An orthogonal frequency system having the same characteristics is preferably used for evaluation, although other frequency analysis methods can also be employed for the this purpose with the same results.

With respect to transferring the process, the advantages of the process are combined, according to the invention, with special features of individual types of LDA in that existing frequency-influencing units such as frequency offset or phase modulators are utilized directly for frequency control for a baseband or sideband shift to compensate for Doppler shifts.

By means of the method according to the invention and its transference to different types of LDA's, it is possible to modify a control loop, known per se from the so-called tracking method of the frequency tracking demodulation, in such a way that a shift in the Doppler frequency is always compensated and, consequently, velocities and derived movement quantities, even for extremely slow measurement objects or discontinuous particle flows, are measured in an accurate and reliable manner. The invention is applicable to homodyne LDA's as well as heterodyne LDA's.

The invention will be described more fully hereinafter with reference to embodiment examples.

DESCRIPTION OF THE PREFERRED EMBODIMENTS

The process according to the invention is based on the fundamental principle of a LDA with frequency tracking demodulation in which laser Doppler signals are generated in a conventional manner by a LDA from moving scattering particles or surfaces and are subjected to narrowband filtration to improve the signal-to-noise ratio, wherein the Doppler frequency is mixed with a regulated mixing frequency for adapting the detector signal to the center frequency of the bandpass filter, so that when there are changes in the Doppler frequency, these changes are always compensated by readjusting the mixing frequency and the mixed detector signal is returned to the center frequency.

According to the invention, in order to identify the changes in the frequency of the mixed detector signal and to determine the Doppler frequency—at least one orthogonal system is generated based on the following steps:

generation of a sine function and a cosine function of the same frequency transformation into a system of rectangular functions and superimposition of the rectangular functions to a sequence, recurring at $2\pi$, of four state intervals in an invertible one-to-one correlation, wherein the interval limits are associated with the jumps in the two rectangular functions at a distance of $\pi/2$, the detector signal containing the Doppler frequency is compared, with respect to its phase position, with the state intervals of the orthogonal frequency system, wherein a change in the phase position containing at least one jump, and therefore a transition from one state interval to another state interval, triggers the required compensation of the change in Doppler frequency by generating the regulated mixing frequency, and the regulated mixing frequency is likewise scanned and compared with an orthogonal frequency system, wherein the mixing frequency is detected as an equivalent of the Doppler frequency and is evaluated such that its direction is identified as a result of the invertibly one-to-one sequence of state intervals.

The described process is described hereinafter with reference to different LDA arrangements.

EXAMPLE 1

Figure 1:
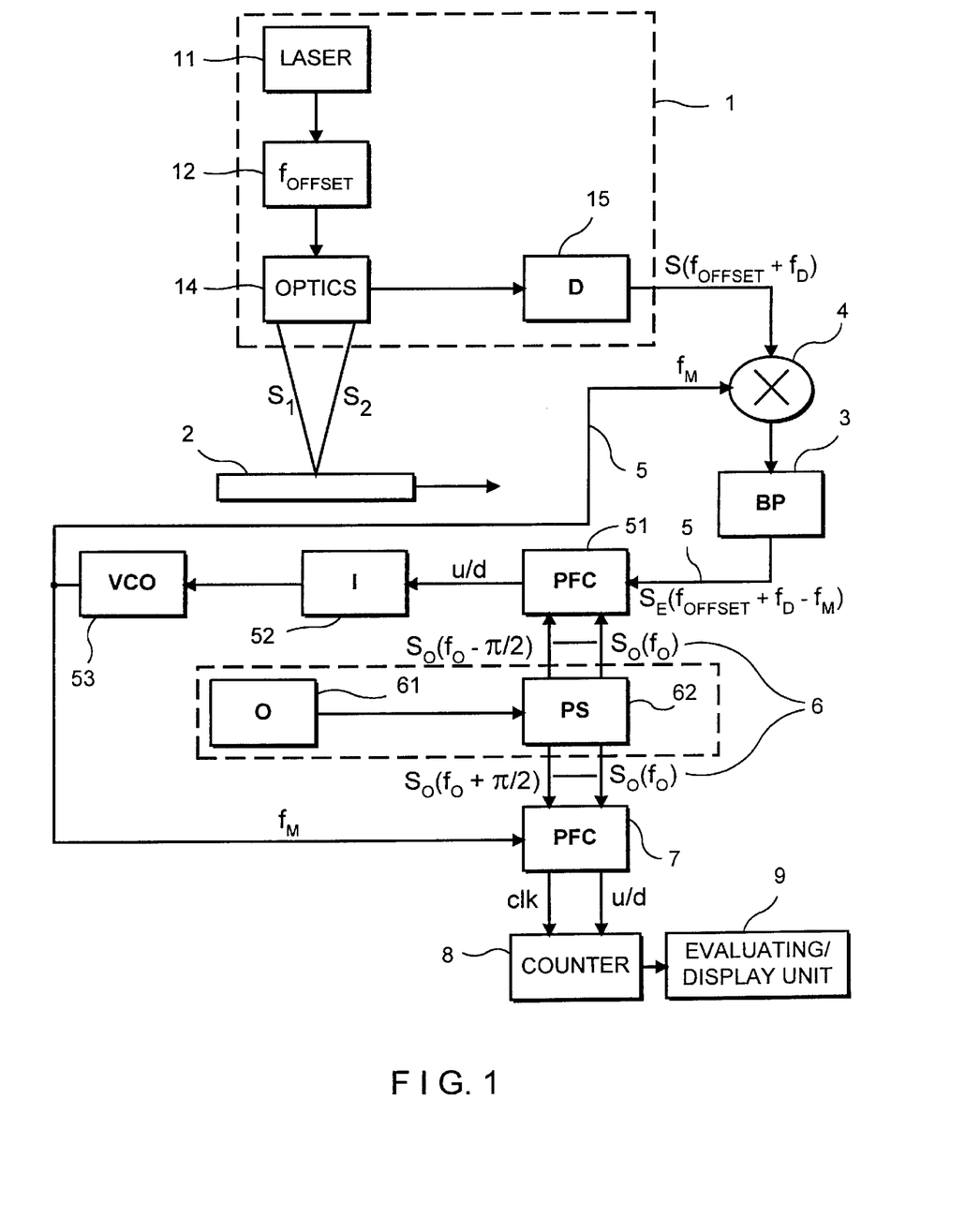
FIG. 1 shows a LDA with control loop according to the invention.

FIG. 1 shows a LDA 1, according to the invention, operating on the commonly used crossbeam principle. In this case, light which is generated by the laser 11 is split into partial beams and the partial beams are provided with a frequency offset $f_{offset}$ relative to one another in a frequency offset unit 12 and directed by means of optics 14 as sending beams $S_1$ and $S_2$ to moving light-scattering object particles whose velocity is to be measured and which are designated in their entirety in the measurement volume as measurement object 2.

The scattered light returning from the measurement object 2 is collected by the same optics 14 and guided onto the detector 15, wherein a frequency mixer 4 is arranged after the detector 15 and before a bandpass filter 3, so that the bandpass filter 3 filters the intermediate frequency from the offset frequency $f_{offset}$ of a mixing frequency $f_M$ and the Doppler frequency $f_D$ in a narrowband. The mixing frequency $f_M$ is regulated (frequency tracking demodulation) in a control loop 5 so as to compensate for the offset frequency $f_{offset}$ in order to always keep the Doppler frequency $f_D$ with its changes close to the bandpass center frequency (which corresponds to the offset frequency $f_{offset}$).

According to the invention, the control loop 5 contains a phase/frequency comparator (PFC) 51 which detects deviations in the phase position of the mix signal passed by the bandpass filter 3 with a fixed predetermined orthogonal frequency system 6, an integrator 51, and a voltage-controlled oscillator (VCO) 53. The orthogonal frequency system 6 is advisably generated by means of an oscillator 61 and a phase shifter 62, wherein the oscillator 61 sends a signal $S_0(f_0)$ from which the phase shifter 61 provides the signals $S_0(f_0)$ and $S_0(f_0+\pi/2)$ as rectangular functions.

Figure 2:
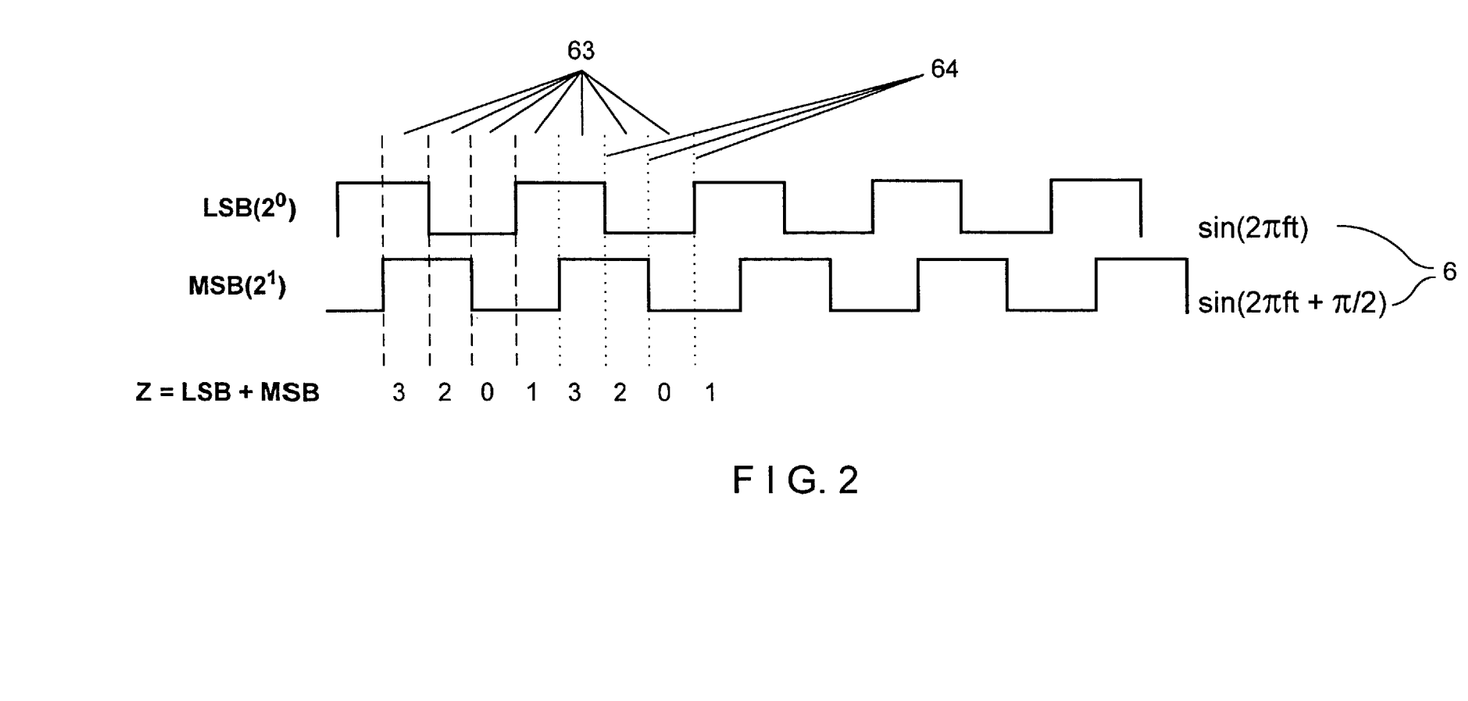
FIG. 2 shows an advantageous type of generation of state intervals of the orthogonal frequency system.

FIG. 2 shows a preferable variant of the orthogonal frequency system 6 which is essentially generated from a sine function and a cosine function of the same frequency, transformed into rectangular functions, and additively superimposed. Various valuation of the amplitudes of the sine function with $A_{sin}=2^0$ (LSB—Low Significant Bit) and of the cosine function with $A_{cos}=2^1$ (MSB—Most Significant Bit) results in numerical values Z for the state interval 63 which change within a cycle by themselves in different ways when an interval limit 64 is crossed depending on whether the transition takes place in the forward direction (to the right) or in the backward direction (to the left).

Accordingly, the following three groups of state transitions according to FIG. 2 are possible for the comparison in PFC 51 when considering the phase position of an edge, for example, a leading edge, of the Doppler signal (which is necessarily clipped in amplitude and accordingly almost rectangular):

| Old State | New State | Result/Action |
|---|---|---|
| 0 | 0 | |
| 1 | 1 | no change in state interval 63; |
| 2 | 2 | no output signal at PFC 51 |
| 3 | 3 | |
| 0 | 2 | |
| 1 | 0 | forward phase shift of Doppler signal; |
| 2 | 3 | signal output "u" (up) at PFC 51 |

-continued

| Old State | New State | Result/Action |
|---|---|---|
| 3 | 1 | |
| 0 | 1 | |
| 1 | 3 | backward phase shift of Doppler signal; |
| 2 | 0 | signal output "d" (down) at PFC 51 |
| 3 | 2 | |

As can be seen from lines 2 and 3 in the table above, each of the transitions between the state intervals 63 is in an invertible one-to-one correlation with the direction in which the interval limits 64 are passed. Further, it will be noted that no signal is generated for changing the mixing frequency $f_M$ by small changes in the phase position of the Doppler signal which move within a state interval 63 of $\pi/2$ of the orthogonal frequency system 6.

Further, according to FIG. 1, the output signal of the PFC 51 is used for the adapted control of the VCO 53 via an integrator 52 which carries out a transformation of the control signals u/d of the PFC 51 into an output voltage which is adapted by stages and switches a voltage stage forward or backward at its input in accordance with the control signal u/d. Strictly speaking, the integrator 52 is not absolutely necessary at this location, but rather only a voltage selector switch with preselected voltage stages, since the PFC 51 itself already detects the phase transitions in intervals of $\pi/2$.

The VCO 53 is driven by the output signal of the integrator 52 and, in a known manner, changes its frequency which is subsequently directed, as mixing frequency $f_M$, to the electronic mixer 4 arranged in front of the bandpass filter 3 in order to compensate for changes in the Doppler frequency $f_D$. The control loop 5 is accordingly closed.

The decisive advantage of the PFC 51 as discriminator of the control loop 5 comes about in cooperation with the orthogonal frequency system 6 according to the invention in that every change in the Doppler frequency $f_D$ only generates an output signal at the PFC 51 when an interval limit 64 is exceeded during the phase comparison of the mixing frequency $f_M$ delivered by the VCO 53 with the state intervals 63 of the orthogonal frequency system 6. On the one hand, this means that a change in Doppler frequency only triggers a controlling process when the change is large enough to cause a change in the state interval 63 and, on the other hand, every phase jump of such magnitude (e.g., triggered by discontinuous particle flows) triggers an erroneous regulating by at most one regulating step at the VCO 53, and the PFC 51 then immediately continues the regulating process again with the correct direction signals u/d.

The mixing frequency $f_M$ delivered by the VCO 53 is used, according to the invention, for evaluation in an additional phase/frequency comparator (PFC) 7. Because of the bandpass filtration at the offset frequency $f_{offset}$ and the filtering out of the sideband $S_E(f_D+f_{offset}-f_M)$, this mixing frequency $f_M$ is equivalent to the actual Doppler frequency $f_D$. Accordingly, there is a frequency which reliably follows the actual changes in Doppler frequency $f_D$.

According to the invention, it is especially advantageous when the mixing frequency $f_M$ is likewise scanned with an orthogonal frequency system 6. For this purpose, it is advisable to use—as shown in FIG. 1—the same oscillator 61 and the same phase shifter 62 that were used for the PFC 51. During phase displacements which cross at least one interval limit 64 of the state interval 63 of the orthogonal frequency system 6, depending on the transition from one state interval 63 to another, the additional PFC 7 emits a counting pulse clk as well as a direction pulse u/d. These two counting pulses are received by a counter 8 which sums the counting pulses depending on direction, so that a subsequent evaluating/display unit 9 can process these counting values to form velocity values or derived movement values and read them out.

EXAMPLE 2

A device having as its object a homodyne LDA is described with reference to FIG. 3. In this case, additional changes according to the invention are needed in known LDA's in order to be able to apply the orthogonal frequency system 6 for phase detection based on the fundamental principle of frequency tracking demodulation.

Figure 3:
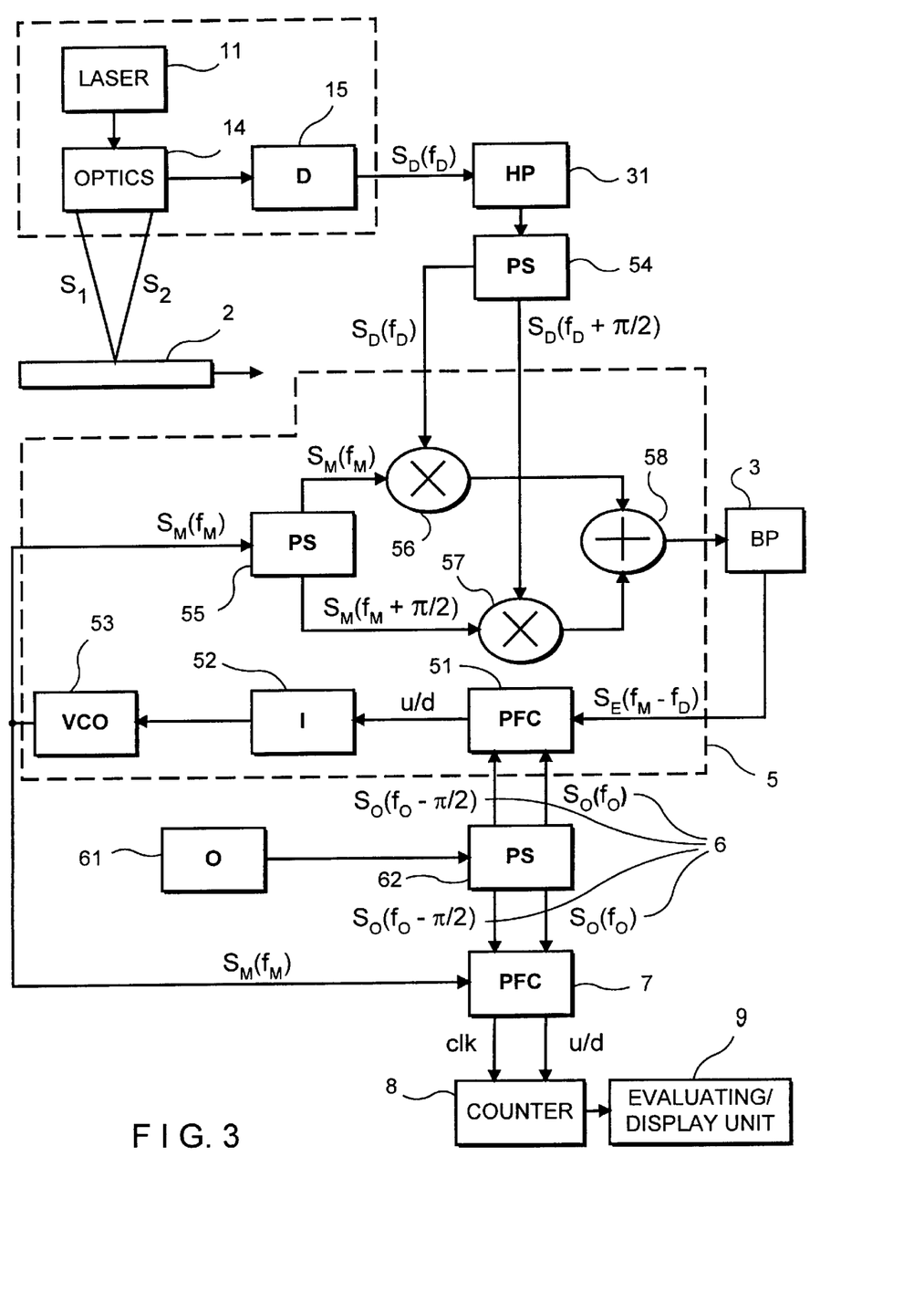
FIG. 3 shows a variant of the invention as a homodyne LDA.

As is shown in FIG. 3, the LDA 1 has only one laser 11 and optics 14 and accordingly no frequency offset. As in Example 1, the sending beams $S_1$ and $S_2$ formed by beam splitting are directed onto the measurement object 2 in crossbeam geometry, so that the scattered light is received and transformed in conventional manner by the detector 15. The detector 15 is preferably followed by a high-pass filter 31 in order to eliminate the dc light component.

In this case, instead of the electronic mixer 4 used in Example 1, a larger network is required before a mixed Doppler signal can be filtered at the bandpass filter 3. The control loop 5 is accordingly configured in the following manner.

First, as will be familiar from the heterodyne LDA in Example 1, a PFC 51 is connected to the bandpass filter 3, followed by an integrator 52 and the VCO 53. The orthogonal frequency system 6 is utilized in the same manner.

For multiplicative mixing, according to the invention, the detector signal passed by the high-pass filter 31 is split via a phase shifter 54 into two signal paths which are offset in phase by $\pi/2$. An additional phase shifter 55 splits the VCO signal into two signal branches that are shifted in phase by $\pi/2$ relative to one another. The signals from the VCO 53 and high-pass filter 31 that are not shifted are combined in a mixer 56 and a mixer 57 mixes the signals from the phase shifters 54 and 55 that are offset in phase by $\pi/2$. The outputs of the two mixers 56 and 57 are applied to an adding element 58, resulting in a single-sideband suppression of the two resulting sidebands from the mix signals and Doppler signal. The advantage of this network-linked control loop 5 consists in that the sideband selection is not effected by the bandpass filter 3, but rather by cancellation as a result of different phase positions of the mix signals from mixers 56 and 57. The bandpass filter 43 only improves the signal-to-noise ratio of the sideband $S_E(f_M-f_D)$ and supplies it to the PFC 51 as in Example 1.

The VCO signal, i.e., the mixing frequency $f_M$, again arrives in the additional PFC 7 for evaluation and is compared with the same orthogonal frequency system 6 used in PFC 51. When phase shifts occur between the mixing frequency $f_M$ and the orthogonal frequency system 6, the PFC 7 generates a counting pulse clk, depending on the crossing of an interval limit 64, as well as direction pulses u/d which are summed depending on direction by a subsequent counter 8 and processed by an evaluating/display unit 9 for outputting movement values of the measurement object 2.

EXAMPLE 3

Figure 4:
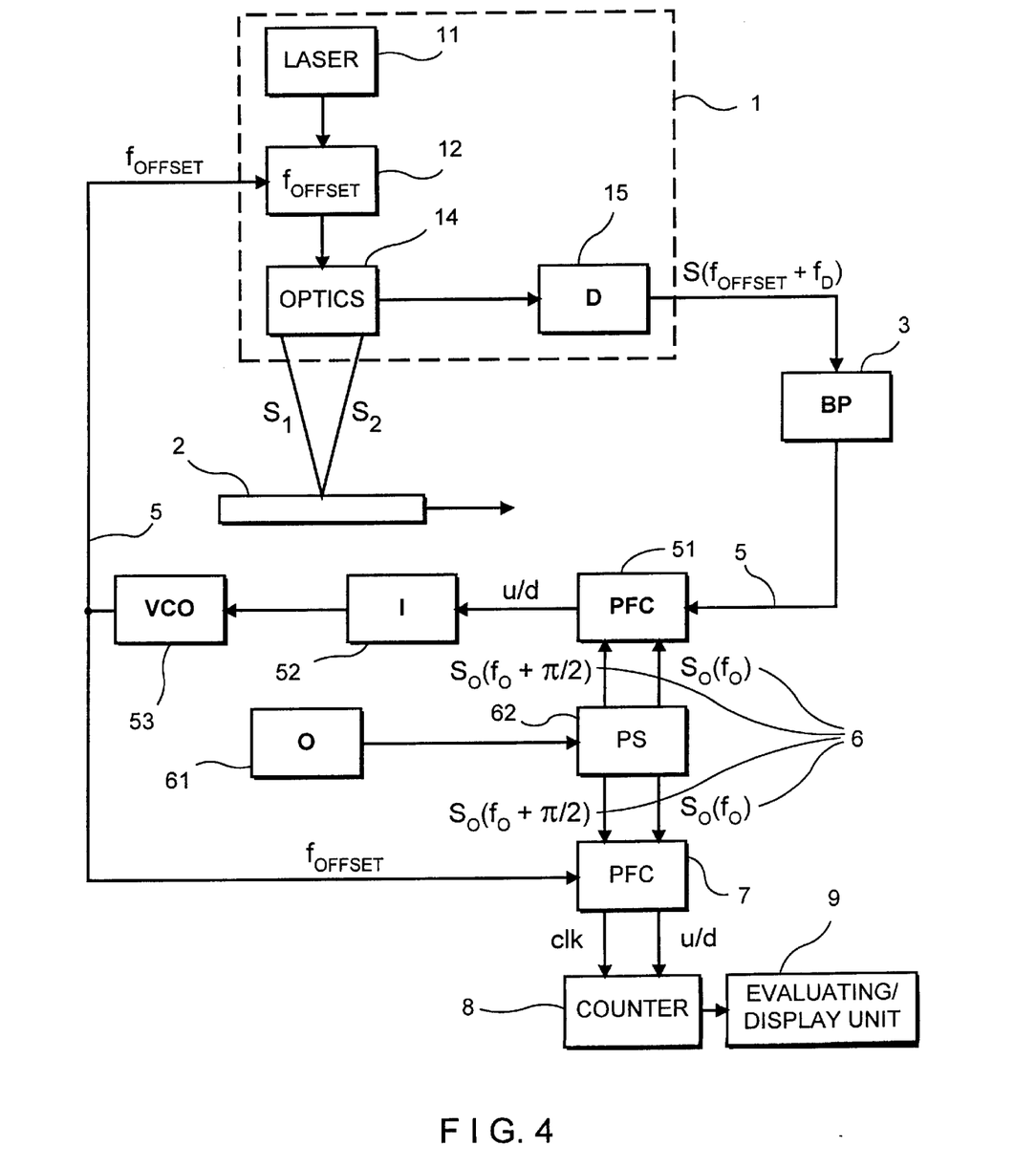
FIG. 4 shows a construction of the invention as a heterodyne LDA with frequency offset.

The device shown in FIG. 4 is a heterodyne LDA 1 with frequency offset, wherein the laser light from laser 11 passes through a frequency offset unit 12 after beam splitting before being directed by means of optics 14 as sending beams $S_1$ and $S_2$ in the preferable crossbeam arrangement onto a measurement location and guided as scattered light from the measurement object 2 to the detector 15.

The transformed, preamplified detector signal $S_D(f_{offset} + f_D)$ is filtered in narrowband in the bandpass filter 3 and changed into rectangular signals. The control loop 5 processes the output signal of the bandpass filter 3 initially, as in Example 1, via a PFC 51, integrator 52 and VCO 53. However, the output signal of the VCO 53 is then used to directly control the frequency offset unit 12, wherein the VCO 53 delivers the offset frequency $f_{offset}$. A baseband shift is accordingly carried out depending on the change in the Doppler frequency $f_D$, wherein the particular advantage of this embodiment form consists in that the controlled VCO frequency is never zero, even when the Doppler frequency $f_D$ approaches zero. This accordingly eliminates the problems usually occurring in the case of low velocities, wherein even velocities which approach zero or lead directly to a standstill are reliably detected.

The evaluation is carried out in the same way as that described in Examples 1 and 2 by comparing the VCO frequency with the orthogonal frequency system 6, wherein it should be mentioned that the VCO frequency processed in the additional PFC 7 is identical to the offset frequency $f_{offset}$ and therefore only its changes are equivalent to the changes in the Doppler frequency $f_D$. However, this does not cause any difficulties once the zero point has been calibrated.

EXAMPLE 4

Figure 5:
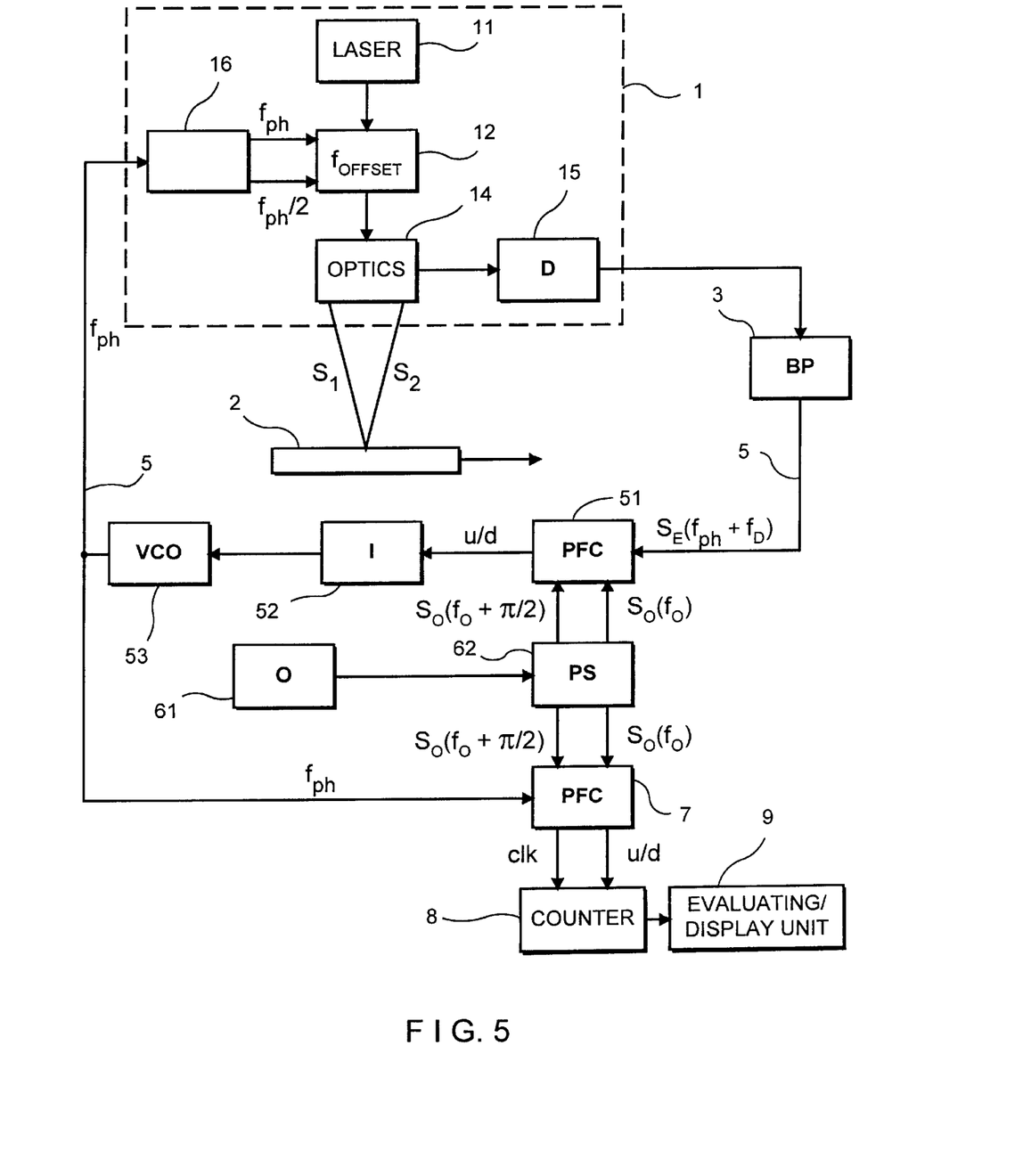
FIG. 5 shows a construction of the invention as a heterodyne LDA with double phase modulation.

FIG. 5 shows a heterodyne LDA 1 with phase modulation which is based on the double modulation principle known from DE 195 37 647 C1.

The LDA 1 comprises a laser 11 whose light is split into partial beams, passes through an optical phase modulator 13, wherein at least one partial beam is modulated with two different modulation frequencies which are coupled so as to be fixed with respect to phase and frequency, one of which is a whole-number multiple of the other modulation frequency, and subsequently, as is conventional in crossbeam arrangements, is directed onto the measurement object 2 via optics 14 as two sending beams $S_1$ and $S_2$. The scattered light of the sending beams $S_1$ and $S_2$ is received in a known manner by the detector 15, whose output signal is supplied to the bandpass filter 3. As in the preceding examples, following the bandpass filter 3, the control loop 5 contains a PFC 51, an integrator 52 and a VCO 53, wherein the PFC 51 compares the signal coming from the bandpass filter 3 with the orthogonal frequency system 6 in the same way.

In this variant of the invention, the output signal of the VCO 53 supplies a frequency, hereinafter called phase modulation frequency $f_{ph}$, which serves as a driving frequency for the phase modulator 13. Since the phase modulator 13 requires two fixedly coupled modulation frequencies in the manner described above, a frequency divider 16 is advantageously used in order to generate the two dependent modulation frequencies from the phase modulation frequency $f_{ph}$ supplied by the VCO 53. For this purpose, in the simplest case, the phase modulation frequency $f_{ph}$ is halved in the frequency divider 16 so that the phase modulation frequency $f_{ph}$ is two-times the modulation frequency $f_{ph}/2$ and the conditions for double phase modulation are accordingly met.

The modulation of the light from the laser 11 is preferably carried out by means of an electrooptical phase modulator 13 which is advisably an integrated optical chip (IOC). Another useful variant for the phase modulator 13 is a controllable Bragg cell in which, however, additional occurring angle changes must be compensated optically. Acoustooptical phase modulators can also be used.

As in all of the preceding examples, the output frequency of the VCO 53, in this case the phase modulation frequency $f_{ph}$, can be used as an evaluating quantity for the Doppler frequency $f_D$. In this case, the above-described orthogonal frequency system 6 is preferably applied again as a basis of comparison in the additional PFC 7 according to Example 1, the output signals u/d and clk are counted in the counter 8 and processed and displayed in the evaluating/display unit 9.

EXAMPLE 5

Figure 6:
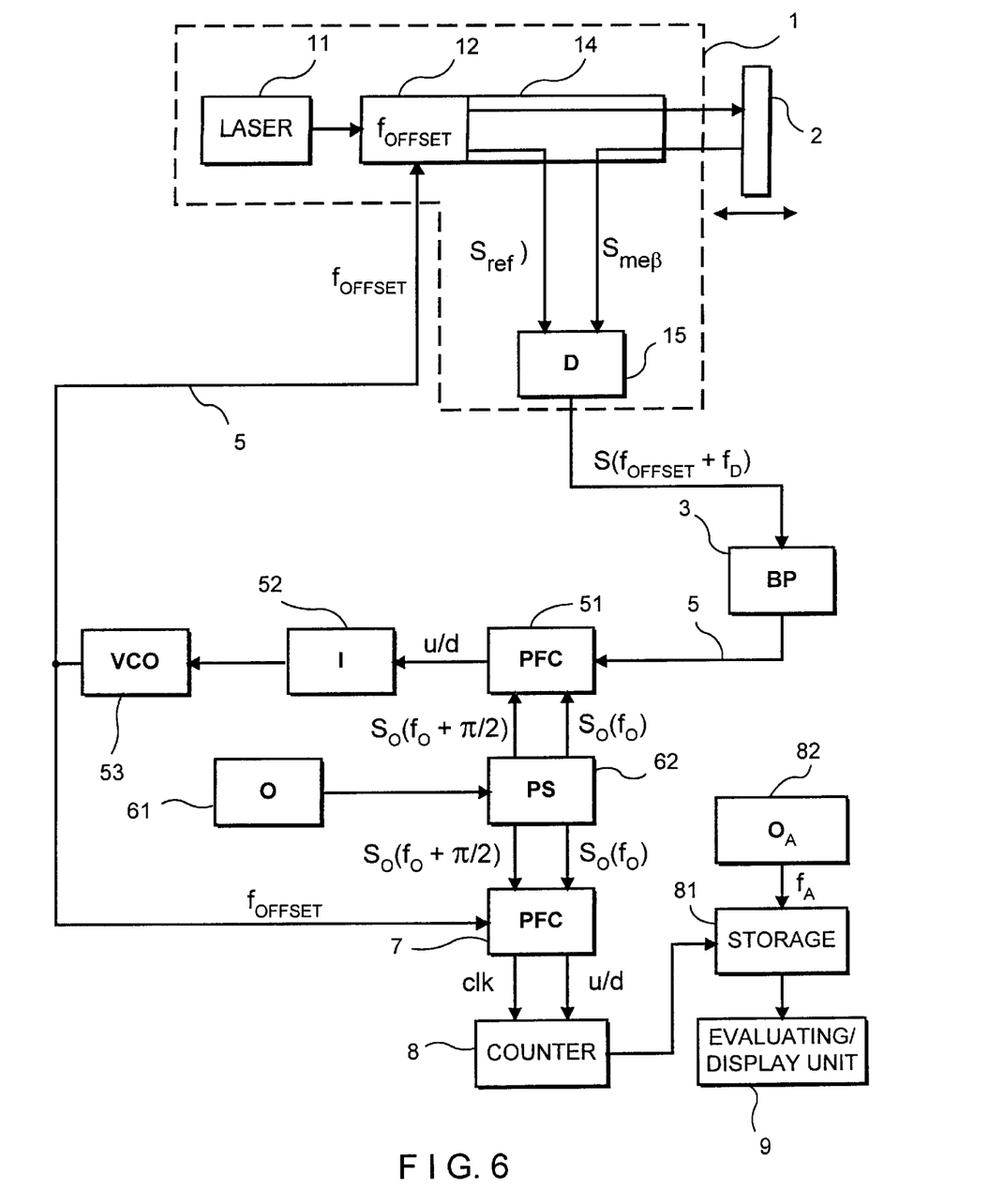
FIG. 6 shows an embodiment form of the invention as a heterodyne reference beam LDA (vibrometer).

FIG. 6 shows a device according to the invention relating to the application of a heterodyne LDA 1 as a vibrometer. A vibrometer measures oscillation frequencies and/or oscillation amplitudes of vibrating surfaces. The reference beam method is used as the embodiment form for this special LDA 1. The reference beam LDA 1, shown schematically, has, in addition to the laser 11, a frequency offset unit 12, wherein the offset frequency $f_{offset}$ generated by the latter is a necessary prerequisite for the detection of forward and backward movements. By means of the optics 14, which in this case have a somewhat more specialized shape in order to enable different beam guidance of a reference beam $S_{ref}$ and a measurement beam $S_{me\beta}$, the reference beam $S_{ref}$ is guided directly onto the detector 15, the measurement beam $S_{me\beta}$ is directed onto the measurement object 2, and the light from the measurement beam $S_{me\beta}$ that is scattered at the measurement object particles is imaged on the same detector 15 and superimposed with the reference beam $S_{ref}$. The output signal of the detector 15 passes through the bandpass filter 3 in conventional manner and, as in all of the preceding examples, is guided in the control loop 5, according to the invention, which comprises the PFC 51 which carries out the comparison, according to the invention, with the orthogonal frequency system 6, the integrator 52, and the VCO 53. As in Example 3, the output signal of the VCO 53 supplies the offset frequency $f_{offset}$ for the frequency offset unit 12, accordingly closes the control loop 5 and is, at the same time, the measurement value equivalent to the change in the Doppler frequency $f_D$ which is supplied to the additional PFC 7 for comparison with the orthogonal frequency system 6. Pulse signals clk and direction signals u/d are generated at the comparator output every time an interval limit 64 of the orthogonal frequency system 6 is exceeded in comparison with the VCO signal equivalent to the Doppler frequency, wherein the sequence of the pulse signals clk represents length increments of the movement of the vibrating surface of the measurement object 2, since the spacing of the interval limits 64 over the frequency $f_0$ of the orthogonal frequency system 6 is exactly known and is constant. The counter 8 counts the length increments depending on the change in the direction signal u/d. The length increments are read into a subsequent intermediate storage 81 in order at a scanning frequency $f_A$ which is adjustable corresponding to the desired accuracy and depending on the vibration frequency of the oscillating surface in a scanning oscillator 82 and supplied to the evaluating/display unit 9. Various renderings of the stored data can be generated in the latter. A FFT (Fast Fourier Transform) operation is advantageously carried out with rendering of the frequency spectrum or temporal rendering of the oscillation course by calculating the oscillation amplitudes. The various actual movement data of the vibrating surface can accordingly be read out and displayed as needed.

While the foregoing description and drawings represent the preferred embodiments of the present invention, it will be obvious to those skilled in the art that various changes and modifications may be made therein without departing from the true spirit and scope of the present invention.

What is claimed is:

1. A Method for the evaluation of laser Doppler signals using a laser Doppler anemometer (LDA) with bandpass filtration and frequency tracking demodulation to compensate for changes in the Doppler frequency with respect to the bandpass filtration, comprising:

generating at least one orthogonal frequency system formed of a sine function and a cosine function;

transforming said system into a system of rectangular functions having a sequence, recurring at $2\pi$, of four state intervals in an invertible one-to-one correlation, wherein interval limits in the form of jumps of one of two additively superimposed rectangular functions are assigned to the state intervals at a phase of $\pi/2$;

comparing, after bandpass filtering and with respect to phase, a detector signal containing the Doppler frequency ($f_D$) with the state intervals of the orthogonal frequency system, wherein a change in phase position relative to the orthogonal frequency system containing at least one jump and, therefore, a transition to another state interval, is used to trigger said compensation of the change in Doppler frequency ($f_D$) by generating a regulated mixing frequency ($f_M$) which is coupled into the LDA; and evaluating the Dopper frequency ($f_D$) as being an equivalent of said mixing frequency ($f_M$), wherein the regulated mixing frequency ($f_M$) is scanned and compared with an orthogonal frequency system, and detected such that a direction of change is designated due to the invertible one-to-one sequence of the state intervals of the orthogonal frequency system.

2. The Method according to claim 1, wherein the orthogonal frequency system for the unequivocal identification of the direction of the change in Doppler frequency ($f_D$) is advantageously formed of two rectangular functions with different amplitudes, one of the rectangular functions is valued at a higher amplitude, preferably twice the amplitude of the other rectangular function, and, as a result of the jumps in the two rectangular functions, a periodic sequence of state intervals results as a superimposition of rectangular functions, so that the values of the state intervals change differently at phase of $\pi/2$ and repeat in the identical sequence only after $2\pi$.

3. The method according to claim 1, wherein the orthogonal frequency system is generated by frequency division from an oscillator.

4. The method according to claim 1, wherein the same orthogonal frequency system is used for scanning the detector signal for the regulation of the mixing frequency ($f_M$) and for scanning the regulated mixing frequency ($f_M$) for determining the Doppler frequency ($f_D$).

5. The method according to claim 1, wherein, in a homodyne LDA, after a high-pass filtering, the Doppler frequency ($f_D$) is mixed electronically with the mixing frequency ($f_M$) and a Doppler frequency ($f_D$) which is phase-shifted by $\pi/2$ is electronically mixed with a mixing frequency ($f_M$) which is phase-shifted by $\pi/2$, two signal channels are generated which contain two sidebands of the Doppler frequency ($f_D$), the two signal channels are reunited by subsequent addition or substraction, one of the two sidebands is eliminated, the remaining sideband is compared with the orthogonal frequency system for regulating the mixing frequency ($f_M$), and the regulated mixing frequency ($f_M$) is scanned with the orthogonal frequency system for evaluating the Doppler frequency ($f_D$).

6. The method according to claim 1, wherein, in a heterodyne LDA, the regulated mixing frequency ($f_M$) is mixed in electronically directly before the bandpass filter.

7. The method according to claim 1, wherein, in a heterodyne LDA with frequency offset, the mixing frequency ($f_M$) is used as offset frequency ($f_{offset}$) for controlling the frequency offset of the LDA, and the regulated offset frequency ($f_{offset}$) is compared with the orthogonal frequency system for evaluation of the Doppler frequency ($f_D$).

8. The method according to claim 1, wherein, in a heterodyne LDA with electrooptical phase modulation for the generation of the sending beams of the LDA, at least one sending beam ($S_1$; $S_2$) is modulated sinusoidally with two different modulation frequencies which are coupled so as to be fixed with respect to phase and frequency, one modulation frequency is a whole-number multiple of the other frequency, a bandpass filtration is carried out in a common multiple of the two modulation frequencies, and a single-sideband suppression is carried out at the two sidebands resulting from the phase modulation by means of suitable adjustment of the phase deviation of the two modulation frequencies, the regulated mixing frequency is used as phase modulation frequency ($f_{ph}$) to control the double phase modulation in the generation of the sending beams ($S_1$, $S_2$), and the regulated phase modulation frequency ($f_{ph}$) is evaluated with the orthogonal frequency system for evaluation of the Doppler frequency ($f_D$).

9. The method according to claim 7, wherein, in a reference beam LDA, a frequency offset is generated in at least one of the measurement beam and reference beam ($S_{me\beta}$; $S_{ref}$), the reference beam ($S_{ref}$) is imaged directly on the detector of the LDA, the measurement beam ($S_{me\beta}$) is directed onto a measurement object and light of the measurement beam ($S_{me\beta}$) scattered at measurement object particles is superimposed with the reference beam ($S_{ref}$) on the same detector, the superimposition signal is evaluated with respect to a shift in the Doppler frequency ($f_D$), the regulated mixing frequency ($f_M$) is used as offset frequency ($f_{offset}$) to control the frequency offset of the reference beam LDA, the offset frequency ($f_{offset}$) compensates for changes of the Doppler frequency ($f_D$), and the regulated offset frequency ($f_{offset}$) is compared with the orthogonal frequency system for evaluation of the Doppler frequency ($f_D$).

10. The method according to claim 7, wherein the offset frequency ($f_{offset}$) is generated by acoustooptical means, and a baseband shift is carried out to compensate for the change in the Doppler frequency ($f_D$).

11. The method according to claim 7, wherein the offset frequency ($f_{offset}$) is generated by electrooptical means, and a baseband shift is effected in order to compensate for the change in the Doppler frequency ($f_D$).

12. The method according to claim 8, wherein, in a reference beam LDA, laser light is divided into a measurement beam ($S_{me\beta}$) and a reference beam ($S_{ref}$), the reference beam ($S_{ref}$) is imaged directly on the detector of the LDA, the measurement beam ($S_{me\beta}$) is directed onto a measurement object and light of the measurement beam ($S_{me\beta}$) scattered at measurement object particles is superimposed with the reference beam ($S_{ref}$) on the same detector, and the superimposition signal is evaluated with respect to a shift of the Doppler frequency ($f_D$), an optical phase modulation is carried out in at least one of the measurement beam ($S_{me\beta}$) and reference beam ($S_{ref}$), modulation is carried out with two different sinusoidal modulation frequencies which are coupled so as to be fixed with respect to phase and frequency, one modulation frequency is a whole-number multiple of the other frequency, filtration is carried out with a bandpass filter at a common multiple of the two modulation frequencies, a single-sideband suppression is carried out at the two sidebands resulting from the phase modulation by means of suitable adjustment of the phase deviation of the two modulation frequencies, the mixing frequency is used to control the phase modulation, the phase modulation frequency ($f_{ph}$) is adapted to compensate for the change in the Doppler frequency ($f_D$), and the regulated phase modulation frequency ($f_{ph}$) is compared with the orthogonal frequency system for evaluation of the Doppler frequency ($f_D$).

13. The method according to claim 9, wherein the object particles of an oscillating surface are observed.

14. The method according to claim 13, wherein length increments of the surface oscillations are determined by counting the state intervals of the orthogonal frequency system that have been passed over, and the counting values are stored intermediately and the counter state is detected at a suitable scan rate.

15. The method according to claim 14, wherein the frequency spectrum of the oscillations is determined from the counting values of the length increments.

16. The method according to claim 14, wherein the oscillation amplitudes or the entire course of oscillation is determined from the counting values of the length increments.

17. A homodyne laser Doppler anemometer with frequency tracking modulation, comprising:

a detector signal including a change in a Doppler frequency;

a control loop signal for constantly compensating said change in Doppler frequency;

said detector signal being divided into two signal paths in the control loop;

electronic mixers for mixing the divided detector signal with two output signals of a voltage-controlled oscillator, said output signals offset in phase by $\pi/2$, being contained in the signal paths;

a summing element for combining the two signal paths after mixing;

said summing element having an output which is applied to the voltage-controlled oscillator via an integrator;

a $\pi/2$-phase shifter being provided for splitting the detector signal into two signal paths, wherein each of two detector signals which are out of phase by $\pi/2$ are joined with the out-of-phase signals of the voltage-controlled oscillator in a mixer, and outputs of the mixers being connected with the summing element;

said summing element being connected on an output side with a first phase/frequency comparator by a narrow-band bandpass filter for comparing the mix signal with an orthogonal frequency system;

the orthogonal frequency system being formed by a sine function and cosine function of the same frequency which are transformed into a system of rectangular functions, and contains a sequence, recurring at $2\pi$, of four state intervals in an invertible one-to-one correlation, wherein interval limits in the form of jumps of one of two additively superimposed rectangular functions are assigned to the state intervals at a phase of $\pi/2$;

said first phase/frequency comparator being connected with the voltage-controlled oscillator via the integrator;

wherein the output frequency of the voltage-controlled oscillator being changed every time a state interval limit of the orthogonal frequency system is exceeded;

said output signal of the voltage-controlled oscillator being a measurement quantity equivalent to the change in Doppler frequency ($f_D$);

a second phase/frequency comparator being provided for evaluating the measurement quantity for the change in the Doppler frequency ($f_D$); and said voltage-controlled oscillator having an output signal, said output signal as well as an orthogonal frequency system being supplied to the second phase/frequency comparator for the evaluation of the phase position of the measurement quantity with respect to the quantity and direction of the state intervals of the orthogonal frequency system that have been passed through.

18. The anemometer according to claim 17, wherein a high-pass filter is arranged anterior to the splitting of the detector signal.

19. A heterodyne laser Doppler anemometer with frequency tracking demodulation comprising:

a control loop being provided to compensate for changes in the Doppler frequency;

said control loop including, after a bandpass filter, a phase discriminator, an integrator and a voltage-controlled oscillator and being returned to an electronic frequency mixer prior to said bandpass filter, so that a mix signal of constant frequency formed from the Doppler frequency and from a regulated mixing frequency is constantly adjusted at an input of the bandpass filter;

a first phase/frequency comparator being used as a phase discriminator for comparing the mix signal passed by the bandpass filter with an orthogonal frequency system;

said orthogonal frequency system being formed from a sine function and a cosine function of the same frequency which are transformed into a system of rectangular functions and contains a sequence, recurring at $2\pi$, of four state intervals in an invertible one-to-one correlation;

wherein interval limits in the form of jumps of one of two additively superimposed rectangular functions are assigned to the state intervals at a phase of $\pi/2$;

a second phase/frequency comparator for evaluation of the Doppler frequency;

said voltage-controlled oscillator having an output signal, said output signal, as equivalent of the change in Doppler frequency ($f_D$), being supplied to the second phase/frequency comparator; and said second phase/frequency comparator being likewise provided with an orthogonal frequency system as a basis of comparison for the evaluation of the phase position with respect to the quantity and direction of the state intervals of the orthogonal frequency system that have been passed through.

20. A heterodyne laser Doppler anemometer with frequency tracking demodulation comprising:

a control loop being provided to compensate for changes in the Doppler frequency;

said control loop having, after a bandpass filter, a phase discriminator, an integrator and a voltage-controlled oscillator and being returned to a frequency mixer, so that a mix signal of constant frequency formed from the Doppler frequency and a regulated mixing frequency of the voltage-controlled oscillator is constantly adjusted at the input of the bandpass filter;

a first phase/frequency comparator being used as a phase discriminator for comparing the mix signal passed by the bandpass filter with an orthogonal frequency system;

said orthogonal frequency system being formed from a sine function and a cosine function of the same frequency which are transformed into a system of rectangular functions and containing a sequence, recurring at $2\pi$, of four state intervals in an invertible one-to-one correlation;

wherein interval limits in the form of jumps of one of two additively superimposed rectangular functions are assigned to the state intervals at a phase of $\pi/2$;

a frequency offset unit of the LDA being configured in a controllable manner as frequency mixer for regulating the input signal of the bandpass filter, wherein the output signal of the voltage-controlled oscillator being used directly for controlling the offset frequency ($f_{offset}$);

a second phase/frequency comparator for evaluation of the Doppler frequency;

said output signal of the voltage-controlled oscillator having an output signal, said output signal, as equivalent of the change in the Doppler frequency ($f_D$), being supplied to the second phase/frequency comparator; and said second additional phase/frequency comparator being likewise provided with an orthogonal frequency system as a basis of comparison for the evaluation of the phase position with respect to the quantity and direction of the state intervals of the orthogonal frequency system that have been passed through.

21. The device according to claim 20, wherein there is at least one Bragg cell for controlling the frequency offset.

22. The device according to claim 20, wherein there is at least one electrooptical phase modulator for controlling the frequency offset.

23. A heterodyne laser Doppler anemometer with optical phase modulation comprising:
light from at least two coherent partial beams being superimposed on light-scattering moving measurement objects after at least one of the partial beams has passed through a phase modulator;
at least components of the partial beams impinging on at least one detector as scattered light;
two sinusoidal driving signals which have different frequencies and amplitudes and are coupled so as to be fixed with respect to phase and frequency being supplied to the phase modulator, wherein one frequency is a whole-number multiple of the other frequency;
a bandpass filter with a filter frequency which is a common multiple of the two frequencies of the phase modulator being arranged following the detector;
one of two sidebands resulting from the double phase modulation being suppressed in the signal at the output of the bandpass filter by means of adjusting the phase deviation of the driving signals of the phase modulator;
the remaining sideband being evaluated as a mix signal with the Doppler frequency;
said bandpass filter being made narrowband;
a control loop being provided to compensate for changes in the Doppler frequency ($f_D$);
said control loop having, after the bandpass filter, a phase discriminator, an integrator and a voltage-controlled oscillator;

said voltage-controlled oscillator influencing the frequencies of the driving signals at the phase modulator so that a mix signal of constant frequency formed from the Doppler frequency ($f_D$) and a phase frequency ($f_{ph}$) regulated by the voltage-controlled oscillator is always adjusted at the input of the bandpass filter;

a first phase/frequency comparator being used as a phase discriminator for comparing the mix signal passed by the bandpass filter with an orthogonal frequency system;

the orthogonal frequency system being formed from a sine function and a cosine function of the same frequency which are transformed into a system of rectangular functions and contains a sequence, recurring at $2\pi$, of four state intervals in an invertible one-to-one correlation;

wherein interval limits in the form of jumps of one of two additively superimposed rectangular functions are assigned to the state intervals at a phase of $\pi/2$;

a second phase/frequency comparator for evaluation of the Doppler frequency ($f_D$);

said voltage-controlled oscillator having an output signal, said output signal, as equivalent of the change in the Doppler frequency ($f_D$), being supplied to the additional phase/frequency comparator; and said second phase/frequency comparator being likewise provided with an orthogonal frequency system as a basis of comparison for the evaluation of the phase position with respect to the quantity and direction of the state intervals of the orthogonal frequency system that have been passed through.

24. The device according to claim 17 or claim 19 or claim 20 or claim 23, wherein an oscillator is provided with a subsequent frequency divider and $\pi/2$-phase shifter to generate the orthogonal frequency system.

25. The device according to claim 24, wherein a 1:4-quadrature divider follows the oscillator to generate the orthogonal frequency system.

26. The device according to claim 19 or claim 20 or claim 23, wherein the phase/frequency comparator for generating the regulated mixing frequency has at its output only one direction signal by means of which a direction-dependent sequence state of equidistant voltage stages serving as an actual control signal for the voltage-controlled oscillator is adjustable at the subsequent integrator.

27. The device according to claim 19 or claim 20 or claim 23, wherein a counter is provided subsequent to the additional phase/frequency comparator for the evaluation of the Doppler frequency, a counting pulse of the additional phase/frequency comparator for generating the regulated mixing frequency is supplied to the counter in addition to a direction signal, a counting pulse (clk) is available at the input of the counter whenever an interval limit of the orthogonal frequency system is exceeded in the additional phase/frequency comparator, and the counting pulse (clk) represents an increment of the change in the Doppler frequency ($f_D$).

28. The device according to claim 19 or claim 20 or claim 23, wherein the LDA is constructed according to a reference beam principle, the light of a laser is divided into measurement beam ($S_{me\beta}$) and a reference beam ($S_{ref}$), the reference beam ($S_{ref}$) is guided directly to the detector, the measurement beam ($S_{ref}$) is imaged on a measurement object, light from the measurement beam ($S_{me\beta}$) scattered on measurement object particles is superimposed with the reference beam ($S_{ref}$) on the same detector, and the superimposition signal can be evaluated with respect to the Doppler frequency ($f_D$).

29. The device according to claim 28, wherein the measurement object is an oscillating surface, and a counter, an intermediate storage, a scanning oscillator, and an evaluating unit are arranged subsequent to the additional phase/frequency comparator, the quantity of state interval limits of the orthogonal frequency system that have been passed through is available at the counter output as counting values ordered according to direction, the scanning oscillator has an adjustable scanning frequency ($f_A$) for intermediate storage of the temporally ordered counting values, and the evaluating unit has different output modes for parameters of the measured oscillating movements of the surface.

* * * * *